United States Patent [19]

Steinbach et al.

[11] Patent Number: 4,970,188

[45] Date of Patent: Nov. 13, 1990

[54] CATALYST FOR REMOVING NITROGEN OXIDES, CARBON MONOXIDE, AND/OR RESIDUAL HYDROCARBONS FROM EXHAUST GASES

[75] Inventors: Friedrich Steinbach, Trenknerweg 133, 2000 Hamburg 52; Norbert Thrams, Ahrensburg; Dieter Jesse, Hamburg, all of Fed. Rep. of Germany

[73] Assignee: Friedrich Steinbach, Hamburg, Fed. Rep. of Germany

[21] Appl. No.: 346,370

[22] Filed: Apr. 28, 1989

Related U.S. Application Data

[63] Continuation of Ser. No. 251,002, Sep. 27, 1988, abandoned, which is a continuation of Ser. No. 19,554, filed as PCT EP86/00368 on Jun. 24, 1986 published as WO87/00077 on Jan. 15, 1987, abandoned.

[30] Foreign Application Priority Data

Jun. 25, 1985 [DE] Fed. Rep. of Germany ....... 3522637

[51] Int. Cl.$^5$ .............................................. B01J 31/18
[52] U.S. Cl. .................................. 502/163; 423/213.2
[58] Field of Search ....................... 502/163, 345, 346; 423/213.2

[56] References Cited

U.S. PATENT DOCUMENTS

| | | | |
|---|---|---|---|
| 3,974,040 | 8/1976 | Siebke et al. | 204/415 |
| 4,070,307 | 1/1978 | Carlson | 502/163 |
| 4,107,078 | 8/1978 | Carlson | 502/163 |
| 4,124,531 | 11/1978 | Frame | 502/163 |
| 4,159,964 | 7/1979 | Frame | 502/163 |
| 4,168,245 | 9/1979 | Carlson et al. | 502/163 |
| 4,234,455 | 11/1980 | Homeier et al. | 502/163 |
| 4,293,442 | 10/1981 | Frame | 502/163 |
| 4,381,922 | 5/1983 | Frey et al. | 422/98 |
| 4,396,899 | 8/1983 | Ohno | 204/192.22 |
| 4,668,349 | 5/1987 | Cuellar et al. | 204/101 |

FOREIGN PATENT DOCUMENTS 2743031 9/1977 Fed. Rep. of Germany ...... 502/163

OTHER PUBLICATIONS

Ullmann's Encyklopadie der technischen Chemie (English version), 1986, vol. A5, pp. 347-353.
Steinbach, F. and Schmidt, H., Journal of Catalysis, vol. 39, pp. 190-197 (1975).

*Primary Examiner*—Anthony McFarlane

[57] ABSTRACT

A catalyst for removing nitrogen oxides, carbon monoxide, and residual hydrocarbons from exhaust gases is made with the use of technical metal phthalocyanines and a carrier onto or into which the metal phthalocyanines are applied, whereupon the system composed of the carrier and metal phthalocyanines is treated, at temperatures above 120° C., with nitrogen oxides and/or mixtures of nitrogen oxide and carbon monoxide and/or with oxygen and/or mixtures of oxygen and carbon monoxide or with nitrating or oxidizing solutions. Instead of activating by nitrating or oxidizing gases or solutions, the activation also may be effected by intimate mixing of metal oxide and metal phthalocyanine on and in a carrier.

16 Claims, No Drawings

CATALYST FOR REMOVING NITROGEN OXIDES, CARBON MONOXIDE, AND/OR RESIDUAL HYDROCARBONS FROM EXHAUST GASES

CROSS-REFERENCE TO RELATED APPLICATIONS

This is a continuation of co-pending application Ser. No. 07/251,002, filed Sept. 27, 1988, now abandoned, which is a continuation of application Ser. No. 07/109,554, filed as PCT EP86/00368 on Jun. 24, 1986, published as WO87/00077 on Jan. 15, 1987, now abandoned.

BACKGROUND OF THE INVENTION

1. Field of the Invention

The invention relates to a catalyst for removing nitrogen oxides, carbon monoxide, or hydrocarbons from exhaust gases by use of metal phthalocyanines which are treated with NO and $O_2$, and to a method of preparing such a catalyst.

2. Description of the Prior Art

Such a catalyst and a method of that kind are known from DE-PS 27 43 03).

In the face of the state of the art, the object ensues of developing the known catalyst such that an entrainment or blowing out of the active component in strong gas currents will be prevented, that the specific activity of the catalyst will be improved by a great surface, and that diminishing of the activity by particle abrasion will be prevented.

The object is met, in accordance with the invention, by catalysts for removing nitrogen oxides, carbon monoxide, and/or residual hydrocarbons from exhaust gases, which catalysts are obtainable by treating metal phthalocyanines with NO and/or $O_2$ at elevated temperatures, and characterized in that, prior to being treated with NO and/or $O_2$, metal phthalocyanines are applied onto or into a carrier, and that subsequently the carrier is treated with nitrogen oxides and/or mixtures of nitrogen oxide and carbon monoxide and/or with oxygen and/or mixtures of oxygen and carbon monoxide or with nitrating or oxidizing gases or vapors at temperatures above 120° C. or with nitrating or oxidizing solutions.

This catalyst as well as methods of making the same and special modifications thereof are characterized in the claims and specification.

In accordance with certain aspects of the invention, a catalyst for removing nitrogen oxides, carbon monoxide, residual hydrocarbons and mixtures thereof from exhaust gases is provided in which the catalyst is prepared by the steps of:

(a) impregnating a carrier with a metal phthalocyanine; and (b) subsequently treating the carrier with a member selected from the group consisting of (i) nitrating gases at a temperature above 120° C., (ii) oxidizing gases at a temperature about 120° C. (iii) mixtures of nitrating and oxidizing gases at a temperature above 120° C., (iv) nitrating solutions, and (v) oxidizing solutions.

In certain embodiments of the invention, prior to step (b), a transition metal oxide is applied to the carrier, either prior to or simultaneously with the impregnation of the carrier with the metal phthalocyanine.

The entrainment or blowing out of the active component in case of strong gase currents is prevented by virtue of the intimate mixing or combining of catalyst and carrier produced in accordance with the invention. The large surface of the carrier raises the specific activity of the catalysts, while the embedding of the active catalysts, totally or partly penetrating the carrier volume, prevents a lessening of the activity by particle abrasion. Furthermore, it was observed that the catalytic activity of the active component is enhanced by the chemical and/or physical interaction between catalyst and carrier.

DESCRIPTION OF THE PREFERRED EMBODIMENTS

The carrier-catalysts according to the invention may be used with any of the typical exhaust gas velocities without the active catalyst component being carried away.

As compared to the prior art, exhaust gas catalysts on the basis of metal phthalocyanines are applied onto or into carrier materials having suitable surfaces such that, on the one hand, a high gas velocity is permitted without leading to the high back pressure which occurs when using pure catalysts without carriers, and without entraining or blowing out the active catalyst substance at high gas velocities. Even if the surfaces wear away by dust and contaminations in the exhaust gas, the fresh surface which is being formed constantly, still contains the catalyst (bulk catalyst).

It was found that the carrier-catalysts produced according to the invention may be used to remove nitrogen oxides, carbon monoxide, and unburnt residual hydrocarbons at flow (space) velocities of up to $10^6 h^{-1}$ in a temperature range of from 0° to 600° C.

Infrared spectroscopy of cuts or fractures has confirmed the uniform distribution of the metal phthalocyanines introduced into the carrier volume (with thorough impregnation) or a layer close to the surface in the case of carrier bodies or granules not impregnated throughout. The chemical interaction with the carriers has been proved by a band shift as compared to the pure metal phthalocyanine. This band shift in the infrared spectrum, a characteristic of carrier catalysts as against catalysts without a carrier, is related directly with the catalytic activity. Thus the catalytic system provided by the invention of a carrier plus modified metal phthalocyanine has specific catalytic properties which differ from those of metal phthalocyanine without a carrier.

The carriers used are ceramic materials, especially porcelain, earthenware, stoneware, diatomaceous earth, silicon oxide, cordierite, steatite, mullite, aluminum oxide, clay, alumina, kaolin, broken flowerpots, loam, or perlite.

Likewise being used are mortar or fillers, especially cement, limestone, dolomite, gypsum, chalk, marl, tuff, slag, pumice, shell lime, sandstone, or fireclay.

Also used as carriers are alumino-silicates, especially zeolites of the A, X Y, or ZSM types or natural zeolites. Furthermore, feldspar, magnesium silicate, zirconium silicate, waterglass, silicic acid, or boehmite.

Glasses, especially sintered glass, glass wool, or open-pore sintered glass powder likewise are used as carriers.

Further carriers used are silicon carbide, boron carbide, activated carbon, graphite, oxides, especially magnesium oxide, titanium oxide, sintered magnesia, aluminum oxide, rare earth oxide, zirconium oxide, zirconia, heavy metal oxides, oxides of chromium, iron, nickel, copper, spinel, oxide and black oxide of manganese, bauxite, zinc oxide, zinc white, titanium oxide, aluminum titanate, vanadium oxide, or vanadate.

Other carriers used are sulfides, especially heavy metal sulfides or zinc sulfide, as well as carbonates, phosphates, or sulfates, especially aluminum phosphate, barium carbonate, limestone, barium sulfate, and furthermore molybdates or tungstates.

Metals, especially sheet metals, foils, powders, or molded bodies are used as carriers.

Mixtures of the substances and classes of substances mentioned are used as carriers. The carriers may be used in the form of powders, pressed objects, granules, honeycomb structures, molded bodies, porous members, or spongy skeletons. Likewise suitable for use are coatings of one of the substances or mixtures mentioned on another material, especially coatings on sheet metal or metal foils.

Suitable solvents to be used with the manufacturing process of the invention are especially sulfuric acid, formic acid, acetic acid, propionic acid, fatty acids, chlorosulfonic acid, chloracetic, di-, and trichloracetic acids, chloronaphthalene, bromonaphthalene, quinoline, benzophenone, n-ethyl carbazole, chlorobenzene, pyridine, pyrrole, organic amines, liquid ammonia, liquid sulfur dioxide, polyphosphoric acid, and dimethyl sulfoxide.

The solubility in some case is very low, no more than a few milligrams per liter. This is sufficient for preparing surface layers impregnated with MPc. The temperature ranges applied reach from the solidification point almost up to the boiling point of the solvent.

Instead of dissolving the metal phthalocyanines altogether, the use of suspensions or mixtures of suspensions and solution is possible as well to effect the impregnating.

The metal phthalocyanines may be purified before applying them to carriers.

Instead of directly dissolving the metal phthalocyanines and impregnating the carriers with the solution or suspension, moreover, the metal phthalocyanines are dissolved by being converted into soluble derivatives; the carriers are impregnated with this solution. Upon stripping of the solvent, the metal phthalocyanines are passed over into the active catalyst, any side groups causing the solubility being split off by oxidation or thermally, at least in part. Alkyl groups, such as tertiary butyl and aryl groups, hydroxyl groups, and groups of the type of —NHR, NR$_2$, —SO$_2$R, —SO$_2$NHR, —SO$_2$NR$_2$ or —SiR$_3$, wherein R represents a hydrocarbon radical, may be mentioned as side groups causing solubility.

The metal phthalocyanines also may be converted into water-soluble derivatives. In that event, especially sulfonic acids of the metal phthalocyanines are used as they adhere well to hydrophilic surfaces of the carriers because of their own hydrophilic nature.

The carriers likewise may be impregnated with intermediate products or solutions of intermediate products of metal phthalocyanines so that the synthesis of the metal phthalocyanines will take place in and on the carrier. Isoindolenine or a derivative and the complementary metal-containing compound dissolved in water-soluble solvents, like glycol, diglycol monoethyl ether or diethanolamine are suitable for this purpose. When the carriers are impregnated, the synthesis is effected by heating to approximately 120°.

Direct synthesis is possible as well upon impregnating the carrier with metal salt solutions, such as acetate solution, drying, further impregnating with suitable intermediate products of the phthalocyanine framework structure, particularly phthalodinitrile, solutions of dicyanobenzene for example in nitrobenzene, mixtures of phthalic anhydride, urea, and ammonium molybdate, and direct synthesis at elevated temperatures.

Polymer metal phthalocyanines likewise may be synthesized in or on carriers The carriers are impregnated with metal salt solutions and dried, and polymer metal phthalocyanine is formed in and on the carrier by heating with tetracyanobenzene in the autoclave under vacuum. The active catalyst then is made from the polymer metal phthalocyanine. Suitable carriers again are sheet metals or metal powders and molded bodies on all of which a coating of polymer metal phthalocyanines may be formed directly by heating in the autoclave with tetracyanobenzene, for transfer into the active catalyst.

Powders, granules, and molded bodies may be used as carriers.

The metal phthalocyanine is rendered soluble by introducing the functional groups which are known from the textile dyeing techniques, the carriers are impregnated, the groups are split off following the known secondary treatment, and then the metal phthalocyanines embedded are converted into the catalyst.

The known methods of using lipophilizing surface groups are applicable as well, whereby the metal phthalocyanines adhere especially well in and on the carriers. This surface lipophilizing of the carriers is realized especially by so-called organosilicone coatings, such as $(CH_3)_3SiNHSi(CH_3)_3$ or $R_3SiNH(SiR_2NH)_nSiR_3$ (wherein $n=0$ to 3, $R=C_1$ to $C_6$ alkyls).

Instead of activating the metal phthalocyanines by treating them with nitrogen oxides and/or mixtures of nitrogen oxide and carbon monoxide and/or with oxygen and/or mixtures of oxygen and carbon monoxide or with nitrating or oxidizing gases or vapors at temperatures above 120° C., the activation may be obtained also directly by intimately mixing them with transition metal oxides and/or oxide mixtures. This intimate mixing is achieved on carriers in particular if the two compounds are applied simultaneously or successively on or into the porous carrier. This interaction already referred to between metal phthalocyanine and the carrier is so favorable in the case of transition metal oxides that the activation of the phthalocyanine is obtained directly.

It is known that metal oxides and mixtures thereof are employed a lot for catalytic reactions with NO and especially with CO. For this reason, very careful examinations were undertaken by way of measuring activities and conversions, to make sure that the catalysts obtained by the joint application of metal oxide and metal phthalocyanine on or into carriers do differ from those with which the metal oxide alone is applied on or into the carrier. This examination proves to be especially convincing if first the transition metal oxide is introduced, then the activity thereof is checked, and subsequently the metal phthalocyanine is introduced in addition. The degrees of conversion clearly are higher than in the case of carriers impregnated with oxides alone, especially so in the temperature range below 250° C.

The invention will be described further below, by way of example.

In all the examples below, a test gas is used to characterize the activity of the catalysts. It consists of nitrogen and an admixture of 1000 ppm of nitrogen oxide, and 3000 ppm of carbon monoxide, unless stated otherwise. The space velocities differ and are indicated in each case. The indication of the starting temperature used to characterize the activity is defined as the temperature at which a conversion of from 2% to 5% is reached.

With full or thorough bulk impregnation, the penetration of the catalyst throughout the volume has been revealed by cuts and fractures and demonstrated by infrared spectroscopy. The same applies to the coloration of border layers.

The measuring times indicated do not relate to the service life (endurance) of the catalysts but instead to the breakoff of the measurements for reasons of test stand capacities, with the activity of the catalysts unchanged.

EXAMPLES 1. 160 g of purified CuPc are dissolved in 1.6 l of formic acid at 80° C. A cordierite honeycomb structure (4"×6") preheated to 90° C. is immersed for 15 minutes in this solution and subsequently dried for from 7 to 10 hours at 90° C. By this impregnation, the honeycomb structure is dyed throughout with 11 g of CuPc (approximately 2% by weight of CuPc in the total material). The catalyst is formed by treatment with a gas mixture of nitrogen containing 1000 ppm of nitrogen oxide and 3000 ppm of carbon oxide, at a volume (space) velocity of 250 $h^{-1}$, starting from room temperature and, in the course of 12 hours, rising to 580° C., for 2 hours remaining constant at 580° C., and then by cooling in the same gas mixture. The catalyst is impregnated throughout the volume of the honeycomb. The carrier catalyst obtained has a temperature of 2% conversion of 180° C. in the test gas mixture at 250 $h^{-1}$, the degree of conversion at 440° C. amounts to 50%, while it is 90% at 520° C., 450 hours measuring time.

A catalyst prepared in this manner is tested with a modified test gas in which CO is fully replaced by just as much $H_2$. The NO conversions are the same, within the limits of the measuring accuracy.

Another carrier catalyst prepared in the same manner is exposed to a flow of gas having a space velocity of 500,000 $h^{-1}$. Even as much as 50 hours later, a downstream filter does not show the slightest blue coloration, an indication that MPc has not been entrained.

Another catalyst made in the same manner from CuPc on a cordierite honeycomb structure is subjected to a long-term test. At 300° C. the degree of conversion is 55%. This activity is maintained over a period of 1100 hours without any diminishing to be seen.

A honeycomb structure prepared in the same manner and dyed thoroughly with CuPc is heated to 500° C. in the course of 12 hours in pure NO of 0.6 l/hr. and then kept constant at this temperature for 2 hours. Upon cooling in nitrogen, the resulting catalyst essentially displays the same activity: temperature of 2% conversion 200° C., 90% conversion at 520° C. The measuring time is 220 hours.

The carrier catalyst mentioned last is exposed to a test gas containing an admixture of 100 ppm of nitrogen dioxide. The nitrogen dioxide is eliminated completely, the degrees of conversion as regards nitrogen oxide ar unchanged.

Corresponding catalysts are prepared with CuPc in acetic acid. The conversions are analogous.

Analogous catalysts are made also with CoPc and NiPc instead of CuPc. Test gas is used for activation. In the case of the carrier catalysts made from CoPc the temperatures of 2% conversion are 280° C., while they are 190° C. with carrier catalysts made from NiPc.

2. Pieces of pipe consisting of open-cell sintered glass are treated in a manner corresponding to example 1. The sintered glass pipe pieces dyed through are arranged in a test reactor in a manner to provide a bulk bed of a volume of one liter. Treatment with test gas converts the same into the active catalyst (upon heating for 2 hours at 510° C.). The resulting carrier catalyst has 180° C. temperature of 2% conversion and a degree of conversion of 70% at 400° C.

Similar catalysts are made with CuPc in acetic acid. The degrees of conversion are analogous.

In the same manner catalysts are made with CoPc and NiPc instead of CuPc. Test gas is used for activation. The temperatures of 2% conversion are 280° C. in the case of carrier catalysts made from CoPc and 190° C. with the carrier catalysts made from NiPc.

3. A catalyst prepared with NiPc according to examples 1 and 2 is tested at 400° C. with test gas at different space velocities: at 200 $h^{-1}$ the conversion is 100%, at 400 $h^{-1}$ it is 86%, and at 1400 $h^{-1}$ it is 45%. The total measuring time is 700 hours.

4. Granulated zeolite (type Y) is dyed with CuPc according to example 1. 100 ml of the dyed granules are activated by test gas (upon heating for 4 hours at 540° C.). The resulting catalyst provides a conversion of 60% at 400° C. in the test gas mixture at a space velocity of 1000 $h^{-1}$.

5. Diatomaceous earth (powder) is dyed with CuPc according to example 1 and converted into granules by spreading across an orifice plate. Upon activation by test gas at 540° C. 100 ml of these granules provide a degree of conversion of 50% at 300° C. in the test gas mixture at 1000 $h^{-1}$ space velocity.

Zeolite powder (type ZSM) is used in analogous manner. Upon activation, 100 ml of bulk granules present a conversion of 80% at 300° C.

Powders of zinc oxide and titanium oxide are used in analogous manner. Fills of thoroughly dyed granules provide conversions of 35% at 300° C.

Talc or another magnesium silicate powder is dyed and granulated in similar manner. Upon activation by test gas at 540° C. a quantity of 1 l of bulk granules have a temperature of 2% conversion of 60° C. at 250 $h^{-1}$. The conversion is 80% at 250° C.

If this catalyst is exposed to a test gas mixture having a reduced CO content (1000 ppm) at 240° C., the conversion is 78%.

6. Instead of preparing a carrier catalyst according to example 1 with the aid of a cordierite honeycomb structure, broken flowerpots are used. The temperature of 2% conversion is 200° C., the degree of conversion is lower because of the less favorable geometry, namely 40% at 520° C.

7. Spheres and green compacts (unsintered balls) of aluminum oxide are dyed in accordance with example 2. The coloration extends to a border layer. When activated at 500° C. in test gas, the carrier catalysts provide a conversion of 40% at 450° C. at 1000 $h^{-1}$.

A catalyst prepared in this manner is tested in a test gas without CO but including 1000 ppm of NO and $NH_3$. The degree of conversion at 450° C. is 35%.

8. Doughs are prepared of zinc oxide, titanium oxide, as well as aluminum oxide by adding water, and then about 10% by weight of CuPc powder is added. The resulting blue pastes are turned over into granules by an orifice plate, as with example 5. Upon transformation into the active catalyst in test gas at 540° C. for 4 hours, catalysts are obtained with degrees of conversion of from 30 to 40% at 400° C.

Further pastes prepared in that manner are coated on sheet metal or adhere to roughened sheets (e.g. aluminum) upon immersion. The sheets which previously were suitably folded or rolled, are placed in the test reactor. Upon activation by means of test gas at 500° C. the temperature of 2% conversion is 220° C., at 500° C. the resulting conversion is 70%.

If the catalysts are made with CoPc instead of CuPc, on the whole the temperatures of 2% conversion are some 20° to 30° C. higher.

9. Based on Al(OH)$_3$, sodium silicate, triethanolamine, a zeolite synthesis (NaY) is carried out in conventional manner at 90° C., being modified by the presence of a CuPc suspension which is agitated vigorously. The settling zeolite precipitate is mixed with the suspended CuPc powder. Upon drying, granules are formed in accordance with example 5. The resulting catalyst substantially has the same activity as described in example 4.

In similar manner, an aluminum hydroxide interspersed with CuPc particles is made by precipitation from aluminum salt solution with ammonia. Upon drying and activating in test gas, it provides an active catalyst having a temperature of 2% conversion of 200° C.

10. 4 g of Cu-dihydroxy-cyclotetraisoindolenine are prepared from 15 g of CuPc by oxidation with 10 ml of 95% nitric acid in anhydrous vinegar (5 parts of nitric acid in 100 parts of anhydrous vinegar) and by subsequent treatment with a 20% solution of ammonia. The purified hydroxy compound is dissolved in a 7% ethanolic ascorbic acid solution and then used to impregnate a cordierite honeycomb structure. Reduction to CuPc is effected by drying at 90° C. The process is repeated three to four times. Some 2 g of CuPc are fixed on the carrier body (fully and thoroughly impregnated) which now clearly is of blue color, and they are transformed into the active catalyst by test gas treatment. The temperature of 2% conversion is 180° C.

11. 15 g of CuPc are stirred slowly into 120 g of 26% fuming sulfuric acid (oleum) while being cooled to below 45° C. Subsequently the whole preparation is heated to 60° C. The solution is stirred into a mixture of 0.5 l of saturated solution of sodium chloride and 400 g of ice, the suspension is diluted to approximately 3 liters by adding cold water, and the CuPc sulfonic acid is decanted through a filter. A solution of the sulfonic acid in water is used for impregnating a cordierite honeycomb structure. Upon drying and activating, the carrier catalyst obtained is the one of example 1, having the activity and adherence described in the example.

Similar steps are taken with the use of CoPc, and the resulting properties of the catalyst are similar.

12. Reacting trichloromethyl-CuPc with tetramethyl thiourea provides the water-soluble isothiuronium salt. Upon impregnation of a cordierite honeycomb structure or granules of diatomaceous earth or NaY and splitting off the hydrophilic group in weakly alkaline solution, the insoluble CuPc is recovered. Drying of the carrier bodies provides the corresponding thorough impregnations to be transformed into the active catalysts by mean of the test gas.

13. A solution is prepared from 10 g of phthalogen brilliant blue IFGM in 200 ml of formamide, and the carrier body being heated to 100° C. is impregnated with this solution. Upon drying for 12 hours at 130° C. the carrier body is dyed all the way through with CuPc. If desired, the process may be repeated once or twice. The 2.1 g of CuPc thus applied and introduced are transformed into the active catalyst by test gas.

14. 100 g of granulated zeolite NaY are treated twice for 24 hours each with a 0.025 molar copper acetate solution and dried for 24 hours at 250° C. (introducing the copper by ion exchange). The faujasites thus exchanged with copper ions are mixed with 125 g of phthalodinitrile under nitrogen and heated in an evacuated autoclave at 250° C. This causes the direct synthesis of CuPc in and on the zeolites. The dark blue granules are washed with acetone, the content of CuPc is about 2.8 g. The carrier catalyst thus obtained is converted into the active state by means of test gas at 520° C. In a bulk fill the temperature of 2% conversion is 180° C.

The same synthesis carried out with a cordierite honeycomb structure as carrier, provides the carrier catalyst to be taken from example 1.

The situation is similar with nickel and cobalt acetates.

15. Together with diatomaceous earth previously impregnated with copper acetate and dried, 18 g of tetracyanobenzene are heated in the autoclave under vacuum at 300° C. This yields polymer CuPc to be transformed into an active catalyst as described in example 5.

The same applies when using zeolite granules as carrier material.

16. A 10×50 cm (rolled) plate of copper (likewise of cobalt, nickel, or iron) is heated with tetracyanobenzene for 24 hours at 400° C. in the autoclave under vacuum. Hereby a coating of polymer CuPc (CoPc, NiPc, FePc) is formed and converted into an active catalyst by treatment with test gas. The temperature of 2% conversion is 250° C.

The situation is similar with metal powders, turning chips, and metal wool.

17. A cordierite honeycomb structure impregnated with CuPc in accordance with example 1 is immersed for a few minutes in concentrated nitric acid after first having been dried at room temperature. After rinsing and drying, a catalyst is provided which has a temperature of 2% conversion of 350° C. and a degree of conversion of 40% at 440° C.

Upon drying at room temperature, a cordierite honeycomb structure impregnated with CuPc according to example 1 is immersed for half an hour in a mixture of 5 parts of 95% nitric acid and 100 parts of anhydrous vinegar. After rinsing and drying, a catalyst is provided which has a temperature of 2% conversion of 250° C. and a degree of conversion of 40% at 400° C.

Corresponding treatment of a cordierite honeycomb structure impregnated with CoPc provides a catalyst having a temperature of 2% conversion of 290° C.

18. 15 g of CuPc are treated with a mixture of 5 parts of 95% nitric acid in 100 parts of anhydrous vinegar while being agitated for half an hour at room temperature. After filtering off, rinsing out, and drying, the catalyst is obtained without carrier. It is then mixed with carriers in accordance with example 8. With the resulting thorough impregnations the degrees of conversion are from 30 to 40% at 350° C.

19. 50 g of Cu-exchanged faujasites (cf. example 4) are stirred for 5 hours at 180° C. in a solution of 10 g of dicyanobenzene in 200 ml of nitrobenzene. The product which is of deep blue color all the way through is extracted with pyridine for 20 hours. The resulting 1.2 g of CuPc on 50 g of faujasite are converted into an active catalyst by test gas treatment. Temperature of 2% conversion: 180° C.

20. 200 g of open-pore sintered glass are impregnated with a solution of 50 g of $CuCl_2$ in 1 liter of water and subsequently dried at 200° C. A mixture of 25 g of phthalic anhydride, 130 g of urea, and 5 g of ammonium molybdate is caused to melt and then heated for 3 hours to 180° C. together with the sintered glass carriers charged with salts of copper. The product is precipitated with diluted hydrochloric acid and boiled. Upon withdrawal from this solution, the carriers are rinsed with cold diluted caustic soda and finally with water. The product is dried. Then what is obtained is 11 g of CuPc on 200 g of sintered glass carriers to be turned into an active catalyst by means of test gas. Temperature of 2% conversion: 180° C.

EXAMPLE 21

An alumino-silicate monolith or a pipe bundle of open-cell sintered glass or a cordierite monolith each are impregnated with suspensions of CuPc in formic acid at 90° C. and dried after decanting of the liquid. The carrier catalysts obtained are charged with from 1 to 4% by weight of CuPc. Upon activation according to example 1, the results obtained in a synthetic exhaust gas of $N_2$ with 1000 ppm of NO, 1000 ppm of $NH_3$, and 1% of $O_2$ at space velocities of from 800 to 1000 $h^{-1}$ are: temperatures of 2% conversion of 180° C. (alumino-silicate carrier), 220° C. (open-cell sintered glass carrier), and 210° C. (cordierite carrier), and conversions of 90% based on NO at 320° C. (alumino-silicate), 360° C. (open-cell sintered glass), and 340° C. (cordierite).

EXAMPLE 22

An alumino-silicate monolith is impregnated at 90° C. with a suspension of CuPc in formic acid and activated, following decanting and drying, by heating to 530° C. in test gas over a period of 20 hours. In a synthetic exhaust gas as the one mentioned in example 21, the temperature of 2% conversion is 120° C. at a space velocity of 1500 $h^{-1}$. Conversions of 50% are reached at 180° C. and of 90% at 230° C.

EXAMPLE 23

A cordierite honeycomb structure is impregnated with a 1 molar aqueous $Cu(NO_3)_2$ solution under evacuation. Following drying at 120° C. and heating in air for 2 hours at 500° C., CuO is obtained. This is followed by impregnating with CuPc suspension according to example 22 and drying for 12 hours.

In a synthetic gas as mentioned in example 21 and at a space velocity of 1500 $h^{-1}$, the catalyst thus made has a temperature of 2% conversion of 140° C. and a degree of conversion of 90% at 240° C.

EXAMPLE 24

A cordierite honeycomb structure is impregnated at 90° C. with a CuPc suspension in formic acid in which likewise 150 g of copper formiate are dissolved and dried after decanting of the liquid. The copper formiate is converted into CuO in an oxidizing gas stream at from 100° to 160° C.

In synthetic exhaust gas and at a space velocity similar to those used with example 23, the resulting catalyst has a temperature of 2% conversion of 140° C. and a conversion of 90% at 240° C.

The examples demonstrate that the fixing of MPc by dyeing techniques and synthesis mechanisms in the widest sense leads to interaction of the organic substance MPc with the inorganic carriers, an interaction revealed by the infrared bands and maintained after the dyestuff has been converted into the active catalyst. Entrainment is prevented and the catalytic activity is altered, as compared to active catalysts without carriers.

What is claimed is:

1. A catalyst for removing nitrogen oxides, carbon monoxide, residual hydrocarbons and mixtures thereof from exhaust gases, said catalyst being prepared by the steps of:
    (a) impregnating a carrier with a metal phthalocyanine; and
    (b) subsequently treating the carrier with a member selected from the group consisting of (i) nitrating gases at a temperature above 120° C., (ii) oxidizing gases at a temperature about 120° C., (iii) mixtures of nitrating and oxidizing gases at a temperature above 120° C., (iv) nitrating solutions, and (v) oxidizing solutions.

2. The catalyst of claim 1 wherein prior to step (b), a transition metal oxide is applied to the carrier, either prior to or simultaneously with the impregnation of the carrier with the metal phthalocyanine.

3. A method for preparing a catalyst for removing nitrogen oxides, carbon monoxide, residual hydrocarbons and mixtures thereof from exhaust gases at temperatures of 0° C. to 600° C. comprising the steps of:
    (a) impregnating a carrier with a metal phthalocyanine; and
    (b) subsequently treating the carrier with a member selected from the group consisting of (i) nitrating gases at a temperature above 120° C., (ii) oxidizing gases at a temperature above 120° C., (iii) mixtures of nitrating and oxidizing gases at a temperature above 120° C., (iv) nitrating solutions, and (v) oxidizing solutions.

4. The method of claim 3 wherein prior to step (b), a transition metal oxide is applied to the carrier, either prior to or simultaneously with the impregnation of the carrier with the metal phthalocyanine.

5. The method as claimed in claim 3 wherein the carrier is in the form of a powder or a molded body and wherein the metal phthalocyanine is dissolved in a solvent to form a solution, the carrier is impregnated with the solution, and the solvent is withdrawn from the carrier.

6. The method as claimed in claim 3 wherein the carrier is in the form of a powder or a molded body and wherein the metal phthalocyanine is suspended in a liquid to from a suspension, the carrier is impregnated with the suspension, and the liquid is withdrawn from the carrier.

7. The method as claimed in claim 3 wherein a solution of the metal phthalocyanine and the carrier is prepared, the carrier is precipitated from the solution to form a precipitate, said precipitate having the metal phthalocyanine associated therewith, and the precipitate is dried.

8. The method as claimed in claim 3 wherein the carrier and the metal phthalocyanine are each in powder form, a liquid is added to the metal phthalocyanine and the carrier to form a suspension or a paste, and the suspension or paste is granulated or molded and subsequently dried or fired at temperatures of up to 600° C.

9. The method as claimed in claim 3 wherein a derivative of the metal phthalocyanine is prepared, said derivative being soluble in a selected solvent, a solution is formed by dissolving the derivative in the selected solvent, the carrier is impregnated with the solution, and the selected solvent is withdrawn from the carrier.

10. The method as claimed in claim 3 wherein the metal phthalocyanine is synthesized on the carrier.

11. The method as claimed in claim 4 wherein the carrier is in the form of a powder or a molded body and wherein the metal phthalocyanine is dissolved in a solvent to form a solution, the carrier is impregnated with the solution, and the solvent is withdrawn from the carrier.

12. The method as claimed in claim 4 wherein the carrier is in the form of a powder or a molded body and wherein the metal phthalocyanine is suspended in a liquid to form a suspension, the carrier is impregnated with the suspension, and the liquid is withdrawn from the carrier.

13. The method as claimed in claim 4 wherein a solution of the metal phthalocyanine and the carrier is prepared, the carrier is precipitated from the solution to form a precipitate, said precipitate having the metal phthalocyanine associated therewith, and the precipitate is dried.

14. The method as claimed in claim 4 wherein the carrier and the metal phthalocyanine are each in powder form, a liquid is added to the metal phthalocyanine and the carrier to form a suspension or a paste, and the suspension or paste is granulated or molded and subsequently dried or fired at temperatures of up to 600° C.

15. The method as claimed in claim 4 wherein a derivative of the metal phthalocyanine is prepared, said derivative being soluble in a selected solvent, a solution is formed by dissolving the derivative in the selected solvent, the carrier is impregnated with the solution, and the selected solvent is withdrawn from the carrier.

16. The method as claimed in claim 4 wherein the metal phthalocyanine is synthesized on the carrier.

* * * * *